Sept. 26, 1961     E. R. LAMSON ET AL     3,001,838

LUBRICATED ANTI-FRICTION BEARINGS

Original Filed April 16, 1958     2 Sheets-Sheet 1

INVENTOR.
EDWARD R. LAMSON
MARTIN J. DEVINE
BY

Arthur L. Collins
ATTORNEY

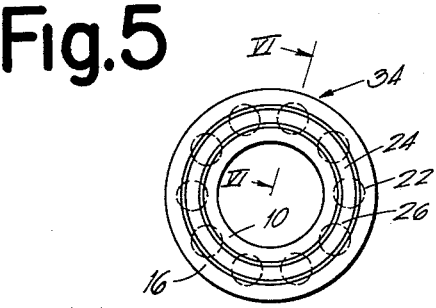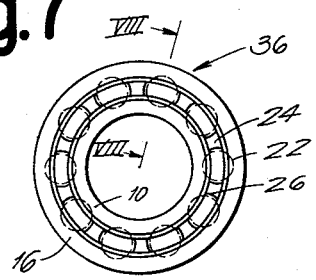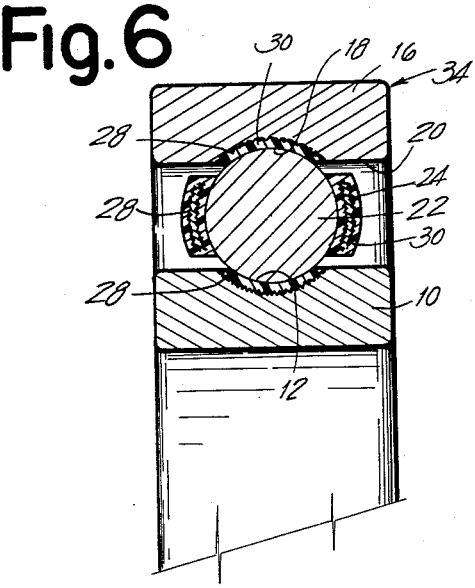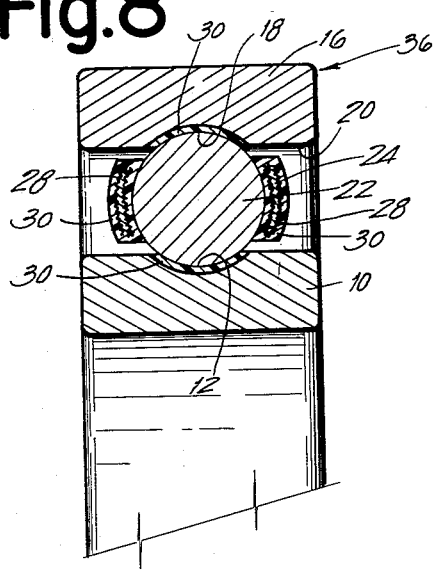

United States Patent Office 3,001,838
Patented Sept. 26, 1961

3,001,838
LUBRICATED ANTI-FRICTION BEARINGS
Edward R. Lamson, Greentree Road, Box 88, R.R. 4, Sewell, N.J., and Martin J. Devine, 2560 Prescott Road, Havertown, Pa.
Original application Apr. 16, 1958, Ser. No. 729,041, now Patent No. 2,978,793, dated Apr. 11, 1961. Divided and this application Oct. 28, 1958, Ser. No. 770,241
8 Claims. (Cl. 308—188)
(Granted under Title 35, U.S. Code (1952), sec. 266)

The invention described herein may be manufactured and used by or for the Government of the United States of America for governmental purposes without the payment of any royalties thereon or therefor.

This is a divisional application of copending application, Serial Number 729,041, filed April 16, 1958, now Patent No. 2,978,793.

The invention relates to lubricated anti-friction bearings and to a method of lubricating anti-friction bearings with bonded film lubricants. More particularly, the invention relates to high speed and high temperature anti-friction bearings such as ball bearings having solid or dry-type lubricants tightly affixed or bonded to the components thereof and to a method of lubricating high speed and high temperature anti-friction bearings by affixing dry-type lubricants to treated and selected surfaces of the unassembled components of the bearings.

Prior attempts to lubricate high speed and high temperature anti-friction bearings with both wet-type lubricants such as greases and bonded film lubricants utilizing a dry-type lubricant or lubricants have been universally unsuccessful. It is well known that grease-type lubricants provide excellent lubrication for anti-friction bearings operated under conditions of relatively low speed and low temperature but have several inherent disadvantages when the bearings are operated under other conditions. For example, at high temperatures, greases become less viscous and have a tendency to seep or leak from a bearing, this loss due to seepage or leakage eventually and many times very quickly resulting in a failure of the greases to provide a film of lubricant between the friction or coacting surfaces of the bearing components. Conversely, at low temperatures, greases substantially increase in viscosity and materially add to the frictional drag or operating torque of a bearing. When greases are used at high temperatures coupled with a high vacuum, the greases vaporize and evaporate and thus deprive the bearing of the needed lubrication. It is also well known that greases deteriorate rapidly when exposed to certain types of nuclear radiation and chemical attack, this deterioration not only resulting in a failure to provide the necessary lubrication but also resulting in a damaging exposure of the bearing components to the harmful effects of the radiation and the corrosive action inherent in the chemical attack.

Bonded film lubricants, on the other hand, utilizing a dry-type lubricant such as a mixture of molybdenum disulphide and graphite as the lubricating constituent of the bonded film, possess none of the inherent disadvantages of the wet-type lubricants, but nevertheless, have never heretofore been successfully employed as a lubricating medium for high speed and high temperature anti-friction bearings. This failure to successfully lubricate bearings of this type with bonded film lubrication has resulted primarily from the failure to develop a method or technique whereby a bonded film lubricant having a substantially uniform predetermined thickness could be rigidly or tenaciously affixed to either all of the components of an anti-friction bearing, selected components of an anti-friction bearing, or selected surfaces of selected components of an anti-friction bearing. A bonded film of substantially uniform thickness is extremely important in the lubrication of high speed and high temperature anti-friction bearings due to the critical tolerances between the friction surfaces of the bearing components. A bonded film which is not substantially uniform in thickness will interfere with the proper relative movement between the components of the bearing and thus produce undesirable frictional forces and heat which will result in a cracking or failure of the bonded film. Bonding or affixing a lubricant to selected components only or to selected surfaces of selected components of an anti-friction bearing is also an important factor in the successful utilization of bonded film lubricants from the standpoint of the use or the environmental application of the bearing. In many environment applications, it has been found desirable and advantageous not to affix a lubricant to all of the components or to all of the surfaces of the components of an anti-friction bearing.

Accordingly, one of the objects of the present invention is to lubricate an anti-friction bearing with a bonded film lubricant.

Another object of the invention is to provide an anti-friction bearing with a bonded film lubricant of substantially uniform thickness on the components of the bearing.

Another object of the invention is to provide an anti-friction bearing with a bonded film lubricant of substantially uniform thickness on selected components or on selected surfaces of selected components of the bearing.

Another object of the invention is to provide an anti-friction bearing the external surfaces of the components of which are roughened and carry a bonded film lubricant.

Another object of the invention is to provide an anti-friction bearing having selected surfaces of selected components thereof which are roughened and carry a bonded film lubricant.

Another object of the invention is to provide a lubricated anti-friction bearing having a substantially uniform operating torque over the entire operating temperature range of the lubricant.

Another object of the invention is to provide a method of lubricating an anti-friction bearing with a bonded film lubricant having a substantially uniform thickness.

Another object of the invention is to provide a method of lubricating an anti-friction bearing wherein all of the components or selected components only of the bearing are roughened and lubricated with a bonded film lubricant having a substantially uniform thickness.

Another object of the invention is to provide a method of lubricating an anti-friction bearing wherein only selected surfaces of selected components of the bearing are roughened and lubricated with a bonded film lubricant having a substantially uniform thickness.

In conformity with these objects, the preferred embodiment of the invention is characterized by a high speed and high temperature ball bearing having rough or roughened external surfaces on the components thereof with a comminuted dry-type lubricant bonded or affixed to all of the roughened external surfaces by a bonding agent comprised of a hardened thermosetting resin. The comminuted lubricant is uniformly dispersed in the bonding agent and the bearing components are completely surrounded or enveloped by a lubricating film having a substantially uniform thickness.

The preferred method envisioned by the invention for lubricating an anti-friction bearing such as a high speed and high temperature ball bearing includes the steps of preparing or surface-treating all of the components of the bearing in an unassembled state to form roughened external surfaces thereon, coating the roughened and unassembled bearing components with a dry-type or solid comminuted lubricant suspended in a thermosetting bonding agent, heating the coated components to harden the bonding agent, and then reassembling the lubricated components into an operative unit to provide an anti-friction bearing having a bonded film lubricant on the friction surfaces thereof. The surface treatment of the bearing components resides in exposing the components to an agent or means capable of producing roughened or microscopically irregular surfaces thereon which serve to anchor the bonded film. The coating must, of necessity, be applied in a manner to provide a lubricating film of substantially uniform thickness, and the selection of the exact constituents for the coating mixture will be determined mainly by the conditions under which the bearing is expected to operate or perform.

These and other objects of the present invention will become readily apparent from the following description taken in connection with the accompanying drawings, wherein:

FIG. 5 is a side elevation of a ball bearing illustrating another embodiment of the invention;

FIG. 6 is an enlarged section taken along line VI—VI of FIG. 5;

FIG. 7 is a side elevation illustrating another embodiment of the invention; and FIG. 8 is a section taken along the line VIII—VIII of FIG. 7.

Figure 1:
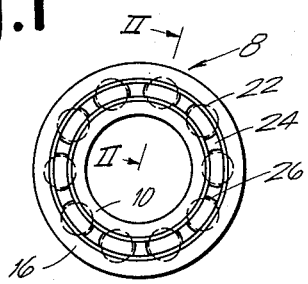
FIG. 1 is a side elevation of a ball bearing illustrating a preferred embodiment of the invention.
Figure 2:
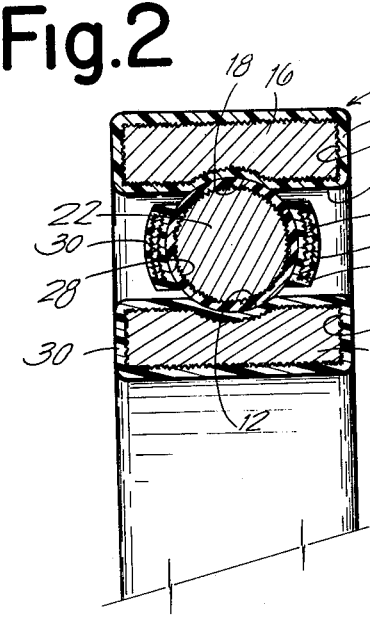
FIG. 2 is an enlarged section taken along the line II—II of FIG. 1.

Referring more particularly to the drawings wherein like structural details and components are designated by like reference numerals, FIGS. 1 and 2 show an anti-friction bearing 8 of the ball-type having components including an inner ring or race means 10 provided with a circumferentially extending groove or raceway 12 in the outer periphery 14 thereof and an outer ring or race means 16 provided with a circumferentially extending groove or raceway 18 in the inner periphery 20 thereof. A plurality of substantially spherical rolling elements or balls 22, in this instance ten in number, are carried in the raceways 12 and 18 and, due to a predetermined curvature of the raceways 12 and 18, are confined therein for rotary movement in a substantially circular orbit between the inner and outer race means 10 and 16, respectively. Being substantially spherical, balls 22 are also capable of independent rotary movement about their own geometrical axes and thus are capable of rotation both relative to themselves and to the inner and outer race means 10 and 16. A predetermined clearance or tolerance (not shown in the drawings) between the balls 22 and the raceways 12 and 18 permits the balls 22 to roll freely over the surfaces of the raceways.

A separator or cage means 24 is carried by the balls 22 and serves to space the balls 22 a uniform or equal distance apart in order to equalize any load that may be applied to the balls 22 through the races 10 and 16. The cage means 24 is provided with a plurality, in this instance ten, of pockets or the like 26 therein (FIG. 1) each of which (FIG. 2) is adapted to receive a ball 22. The inner periphery of each pocket 26 is provided with a predetermined curvature and is adapted to be carried on and thus frictionally engage the peripheral surface of its received ball 22.

The components of the anti-friction bearing 8 in this preferred embodiment of the invention are made of steel but may be made of any other material suitable for bearing use such as iron, stainless steel, etc. Various alloys of steel and stainless steel have been found to be particularly satisfactory materials for use in the construction of high speed and high temperature anti-friction bearings. Inasmuch as the structure and function of ball-type anti-friction bearings as well as the materials utilized in the construction thereof are well known in the art and per se form no part of the present invention, further discussion thereof is deemed unnecessary. Suffice it to say that in the use or environment application of the bearing 8, the inner race means 10 is adapted to receive a shaft or the like (not shown) which when rotated will also rotate the inner race means 10 and thereby impart rotation to the balls 22.

As best seen in FIG. 2, all of the components 10, 16, 22 and 24 of bearing 8 have roughened or microscopically irregular external surfaces 28 thereon and the roughened surfaces carry a lubricating film or coating 30 which completely surrounds or envelops each of the bearing components and is tightly affixed or bonded thereto. The roughened surfaces 28 on the bearing components provide receptive and tenaciously adhering inner bearing surfaces for the lubricating film 30 and in effect provide a positive anchoring means or mechanical interlock between the coating 30 and the bearing components. Roughened external surfaces 28 need have no particular "grade," "fineness ratio" or configuration and any suitable means or process may be utilized to effect the desired surface roughness or irregularity. Processes such as "phosphatizing," acid etching and mechanical abrading have been found to provide extremely desirable results, it being appreciated of course that these processes do not constitute a limitation on the article or lubricated bearing of the present invention and are merely cited as illustrations. A process suitable for use in roughening the external surfaces of anti-friction bearings are hereinafter discussed in greater detail in connection with the Method of Lubricating Anti-Friction Bearings.

Constituent-wise, the film lubricant 28 is comprised of a solid comminuted lubricant uniformly dispersed in a cured thermosetting bonding agent. In this preferred embodiment of the invention, the bonded film 30 is comprised of a mixture of finely pulverized molybdenum disulphide and graphite dispersed in a cured phenolic resin, the pulverized lubricant being mixed in a substantially 9:1 ratio by weight with 9 parts of molybdenum disulphide to 1 part of graphite. While the constituents utilized in this preferred embodiment have been found to provide a satisfactory lubricating film, it will be appreciated of course that these constituents are merely illustrative of the invention and are not to be construed in a limiting sense. The selection of the particular constituents comprising the bonded film is strictly a matter of choice and may include any other suitable dry-type comminuted lubricant or lubricants such as boron nitride, tungsten disulphide, or the like in combination with other suitable thermosetting bonding agents such as formaldehyde resins, silicone resins and vinyl resins. Suffice it to say, however, that the thermosetting agent selected should be capable of forming a tight bond that does not crack or "flake-off" in use and should be resistant to the deleterious effects of heat and pressure and to the action of hydrocarbons such as greases, oils and the like.

The mixture of comminuted molybdenum disulphide and graphite utilized as the lubricant in the preferred embodiment of the invention is a 5 micron grade although the size of the graphite particles is not critical. It has been found, however, that a solid comminuted lubricant having a particle size not greater than 7 microns provides a better lubricating action than a lubricant of larger particle size. The smaller size lubricant particles have a tendency to become more evenly dispersed in the thermosetting bonding agent and thus provide a more effective distribution of the lubricant.

It will also be appreciated that the dry-type lubricant of the bonded film may be comprised of single comminuted lubricant such as molybdenum disulphide only instead of a mixture of two lubricants or furthermore may be comprised of a mixture of more than two lubricants. If it is desired to use more than one comminuted lubricant in the bonded film, the lubricants selected can be mixed in equal or dissimilar proportions and the particle size of the lubricants may also be varied. The selection of a single comminuted lubricant or a predetermined blend of two or more will, of course, be a matter of choice which will for the most part depend on the environmental application of the lubricated bearing. For example, if it is desired to operate an anti-friction bearing at an extremely high temperature, it has been found that a comminuted lubricant comprised wholly or principally of molybdenum disulphide or boron nitride will provide a much more satisfactory lubricant than graphite.

The film thickness of a bonded film lubricant is especially important from the standpoint of satisfactory bearing operation, and in the preferred embodiment of the invention (as best seen in FIGURE 2), film 30 on all of the components of bearing 8 has a thickness of approximately 0.0003". A film thickness of approximately 0.0003" is preferable in most instances although it should be pointed out that the film thickness per se is not critical. It has been found, however, through extensive use and experimentation, that a bonded film thickness of at least 0.0002" and not more than 0.0005" will provide the most satisfactory lubrication for anti-friction bearings. Past performance tests on anti-friction bearings, especially high speed and high temperature anti-friction bearings, have shown that bonded lubricant films having a thickness of less than 0.0002" or greater than 0.0005" will readily fail in use after a short time of bearing operation and will thus fail to provide the necessary lubrication. The selection of a bonded film of the proper or desired thickness will again be a matter of choice which will depend on the particular bearing being lubricated and the conditions under which it is desired to operate the bearing. The tolerances between the bearing components, the bearing speed and temperature, the temperature of the ambient atmosphere or cooling medium and the loading of the bearing are all factors which must be considered in making a selection of the proper thickness for the bonded film lubricant.

Although it is preferable that the bonded film on all of the bearing components should be substantially identical in thickness and should be maintained within the 0.0002"–0.0005" range, it will be apparent to those skilled in the art that the thickness of the bonded film may also be varied within the preferable range of 0.0002"–0.0005" from one bearing component to another without affecting the optimum lubricating action or performance of the bonded film. For example, the bonded film on the balls of the bearing may have a thickness of 0.0002", on the race means may have a thickness of 0.0003" and on the cage means may have a thickness of 0.0005". On the other hand, it has also been found that the thickness of the bonded film on the cage means of a bearing may exceed and even greatly exceed the preferred maximum thickness of 0.0005" without seriously impairing the lubricating action of the bonded film. Bonded film thicknesses of up to 0.0012" have been found in some instances to provide satisfactory lubrication on a bearing cage means. This increase in film thickness on the cage means of a bearing over and above the preferable thickness of the film on the other components of the bearing is permissible in view of the fact the tolerances between the cage means and the balls is not as close as the tolerances between the other components of the bearing.

It will also be noted in FIG. 2 that the bonded film 30 is substantially uniform in overall thickness on the surface or surfaces of each of the bearing components. This substantial uniformity in thickness is especially important from the standpoint of preventing rupture or failure of the bonded film, particularly when the bearing is operated at high speeds and high temperatures. Due to the critical tolerances between the surfaces of the components of an anti-friction bearing, a bonded film which is not substantially uniform in thickness will readily produce undesirable frictional forces and heat which will quickly result in a failure of the bonded film.

Anti-friction bearings lubricated in accordance with the preferred embodiment of this invention and operated at shaft speeds at 10,000 r.p.m. and faster and light radial and thrust loads applied to the bearings have been found to perform satisfactorily for many hours without a failure or breakdown of the bonded film lubricant. On the other hand, it has also been found that when the balls or rolling elements of an anti-friction bearing in addition to the other components thereof are lubricated with a bonded film, the bearing will operate for much longer periods of time without failure of the bonded film if the shaft speed is kept below 10,000 r.p.m. and if the loading on the bearing is maintained at a relatively low value.

Figure 3:
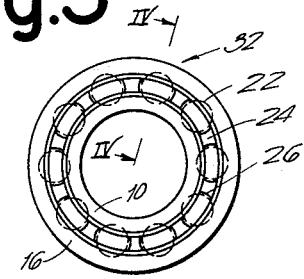
FIG. 3 is a side elevation of a ball bearing illustrating another embodiment of the invention.
Figure 4:
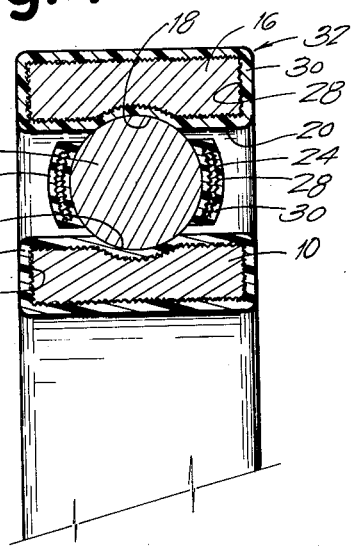
FIG. 4 is an enlarged section taken along the line IV—IV of FIG. 3.

FIGS. 3 and 4 show another embodiment of the invention wherein all of the components of an anti-friction bearing 32 except the balls 22 thereof are provided with roughened external surfaces 28 thereon and are coated with a bonded film lubricant 30. Bearing 32 is otherwise identical in all structural details to bearing 8 shown in FIGS. 1 and 2, and the thickness of the bonded film 30 within the limits hereinbefore discussed in connection with the preferred embodiment of the invention as well as the constituent mixture of the bonded film 30 is strictly a matter of choice which is again dependent on the environmental application of bearing 32 and the conditions under which it may be expected to operate. Performance tests have indicated that an anti-friction bearing lubricated in accordance with this embodiment of the invention will operate satisfactorily for many hours at shaft speeds of 10,000 r.p.m. with relatively heavy radial and axial loads applied to the bearing without failure of the bonded film 30. In general, it has been found that an anti-friction bearing lubricated as shown in FIGS. 3 and 4 will operate satisfactorily for much longer periods of time and at higher speeds and under much heavier loading than an anti-friction bearing lubricated in accordance with the preferred embodiment of the invention.

FIGS. 5 and 6 show another embodiment of the invention wherein an anti-friction bearing 34 is provided with roughened external surfaces 28 and a bonded film lubricant on only the cage means 24 and the raceways 12 and 18 thereof. Bearing 34 is otherwise identical in all structural details to bearing 32 of FIGS. 3 and 4. Bearing 34 has generally been found to have performance characteristics substantially identical to the performance characteristics of bearing 32; however, its chief advantage over bearing 32 has been found to reside in certain environmental applications of the bearing wherein the widths of the bearing race means 10 and 16 and the outside diameter of the outer race means 16 are critical. By eliminating the bonded film lubricant on the two race means other than coating the surface of the raceways 12 and 18 thereof, the maximum outside dimensions of the two race means can be somewhat reduced.

FIGS. 7 and 8 show another embodiment of the invention wherein an anti-friction bearing 36 is provided with a lubricating film 30 only on the raceways 12 and 18 thereof and is provided with both roughened external surfaces 28 and a bonded film lubricant 30 on the cage means 24 thereof. Bearing 36 is otherwise identical in all structural details to bearing 34. Bearing 36 has the same dimensional advantages as bearing 34 by virtue of the fact that the raceways 12 and 18 only thereof are covered with the bonded film lubricant and has been found to have performance characteristics substantially identical to those of bearing 34. The only operational difference between the two bearings has been found to reside in the duration or time-length of satisfactory operation. Performance tests have revealed that under the same axial and thrust loading bearings lubricated in accordance with the construction of bearing 34 will operate satisfactorily for a slightly longer period of time than bearings lubricated in accordance with the construction of bearing 36, this increased duration of operating time without loss of lubricity apparently resulting from the roughened external surfaces on the raceways of the bearing.

Anti-friction bearings lubricated in accordance with the present invention have been found to perform satisfactorily and to possess a relatively low and a substantially uniform operating torque or frictional drag over a wide range of operating temperatures. Tests have shown that an anti-friction bearing lubricated in accordance with the preferred embodiment of the invention will perform at a substantially constant operating torque at temperatures ranging from −94° F. to 350° F. These tests also showed that there was very little difference between the starting and running torque of the bearing so lubricated. Tests conducted on anti-friction bearings lubricated as shown in FIGS. 3 and 4, FIGS. 5 and 6, and FIGS. 7 and 8 also revealed the existence of a relatively low starting torque, a substantially constant operating torque over a wide temperature range and a small differential between the starting and running torques of the bearings so lubricated, the temperature varying between −94° F. to 350° F.

*Method*

The preferred method of lubricating anti-friction bearings and more particularly high speed and high temperature ball-type bearings, all of the components of which are made of steel, is comprised of the following steps, the method being operable to produce a lubricated bearing substantially identical to the lubricated anti-friction bearing shown in FIGS. 1 and 2. The unassembled components of a steel ball bearing, the inner and outer race means, the balls or rolling elements and the cage means, are first cleaned to effect the removal of any contaminating foreign matter from the external surfaces thereof, particularly the removal of oils and greases. The components are cleaned in this preferred embodiment of the invention by vapor degreasing with a trichloroethylene vapor, although it will be apparent that the components could be cleaned with any other suitable type of cleaning agent or could be cleaned in any other suitable manner. On the other hand, the cleaning step may be completely eliminated if the components are free of contaminating foreign matter, the cleaning step therefore merely being an optional step to be used when necessary.

Following the cleaning operation, the unassembled components of the bearing are prepared for coating or surface-treated to form roughened or miscroscopically irregular surfaces thereon. The unassembled components of the bearing are preferably surface-treated by a phosphate-type-process well known commercially as "Thermoil Granodine," the process consisting essentially of dipping the bearing components into an acid solution of metal phosphates. The exposure of the steel bearing components to the action of the acid metal phosphates effects a deposit of crystalline metal phosphates on the surfaces of the bearing components and thereby provides the desired roughness or microscopic irregularity. While the use of the "Thermoil Granodine" process has been found to provide a satisfactory means to roughen the surfaces of the bearing components, it will be apparent to those skilled in the art that other phosphate-type surface-treating processes could be just as effectively utilized, processes such as those well known commerically as "Parkerizing" and "Bonderizing." The selection of a particular phosphate-type process is obviously meant to be illustrative of the invention and is not to be interpreted in a limiting sense.

Instead of a phosphate-type of surface treatment, the steel bearing components may also be roughened by acid etching, mechanically abrading or by any other suitable means or process. A phosphate-type of surface treatment is preferable, however, inasmuch as the deposit of metal phosphates effected thereby imparts a corrosion-resistance property to the bearing components.

After the surface-treatment, the unassembled components of the bearing are coated with a lubricating composition or film comprised of a solid comminuted lubricant suspended in a thermosetting bonding agent, which in this preferred embodiment is comprised of a mixture of finely pulverized or comminuted molybdenum disulphide and graphite suspended in a phenolic resin. The mixture of pulverized lubricants and phenolic resin is thinned by the addition of an organic solvent mixture thereto, which in this preferred embodiment is comprised of a mixture of 50% methylethylketone, 25% xylene and 25% butanol, and the thinned mixture is then applied to the bearing components by spraying. The mixture may be thinned to any desired consistency suitable for spraying, and it will be appreciated that any suitable thinner other than the mixture used in connection with the preferred embodiment may be utilized, thinners such as xylene, xylene-toluene, toluene, etc.

The proportionate mixture of the constituents of the coating composition utilized in the preferred embodiment of the invention includes the following constituents in percentages by weight: molybdenum disulphide 18, graphite 2, phenolic resin 12, thinner 68. The proportionate mixture of constituents is not critical, however, and will be determined mainly by such factors as the environmental application of the bearing and the tolerances between the components thereof. Furthermore, it will be readily understood by those skilled in the art that the percentages of the constituents utilized in the preferred embodiment of the method is merely illustrative of the invention and is not to be interpreted in a limiting sense. Mixing of the constituents may be effected by any suitable means such as milling or agitating. The size of the graphite particles, likewise, is not critical although it has been found that solid lubricants having a particle size not greater than 7 microns provide the best lubrication. Accordingly, the comminuted graphite utilized in the preferred embodiment is of a 3 micron particle size.

A thermosetting bonding agent other than a phenolic resin may also be used. Organic bonding agents such as silicone resins, vinyl resins, and epoxy resins have been found to be satisfactory. As discussed hereinbefore, however, the bonding agent selected must be capable of holding a solid comminuted lubricant in suspension and must also be resistant to heat and pressure in addition to the attacks of various hydrocarbons.

Instead of a mixture of molybdenum disulphide and graphite, the lubricant in the coating composition may be comprised of only a single comminuted lubricant or a mixture of more than two comminuted lubricants. Other suitable lubricants in comminuted form such as boron nitride and tungsten disulphide may be utilized. The selection of a particular lubricant or lubricants, as discussed hereinbefore in connection with the preferred embodiment of the lubricated bearing (FIGS. 1 and 2), is again a matter of choice depending mainly on the environmental application of the bearing.

As also mentioned hereinbefore in connection with the preferred embodiment of the lubricated bearing, the coating composition on the bearing components must be substantially uniform in thickness and the thickness preferably should not be less than 0.0002" or greater than 0.0005". Therefore, in spraying the components of the bearing, care must be exercised to insure the application of a substantially uniform film to the components, the film having in this preferred embodiment a thickness of approximately 0.0003". It is also noteworthy to mention that it is preferable to rotate the bearing components while the lubricant coating is being sprayed thereon. The rotation of the components will facilitate the application of the coating to the components and will more or less insure that the coating will be substantially uniform in thickness on all of the surfaces of the components.

Although spraying is the preferred method by which the coating or lubricant film is applied to the bearing components, this invention also contemplates the use of any other suitable method of coating the components such as by dipping or brushing. Any suitable method may be utilized, but the method selected should insure the application of a substantially uniform film having a predetermined thickness.

After coating, the unassembled bearing components are air dried or dried at room temperature for a predetermined period. In the preferred embodiment of the invention, the coated components are air dried for one hour at an ambient temperature of 70° F. It will be understood of course that this preferred time and temperature are not critical and may be varied to a considerable extent far above or far below these preferred values. The purpose of the air drying step is to insure the formation of a smooth external surface on the coating or film covering the bearing components through the slow evaporation of the solvent in the coating. On the other hand, when the coating includes a solvent having a high vapor pressure, the air drying step in the method may be omitted inasmuch as most of the solvent will have already evaporated upon completion of the spraying or coating operation.

After air drying, the unassembled components of the bearing are heated to harden the thermosetting bonding agent and thereby tightly bond or affix the comminuted lubricant to the bearing components, the roughened surfaces of the components providing a tenacious mechanical interlock between the bonded lubricant film and the bearing components and thereby being operable to prevent any relative movement therebetween. The coated components in the preferred embodiment are heated by baking, the componets being baked for a period of one hour at a tempertaure of 300° F. The temperature selected for heating obviously should not exceed the decomposition temperature of the coating but otherwise is not critical. Any heating temperature which produces a quick thermosetting of the bonding agent and a consequent rigid bonding of the comminuted lubricant to the roughened surfaces of the bearing components will be satisfactory.

After being heated, the unassembled components of the bearing are assembled into an operative unit to provide a anti-friction bearing substantially identical to the bearing shown in FIGS. 1 and 2, an anti-friction bearing having a bonded lubricant on all of the surfaces of the components thereof and, more particularly, on the friction surfaces of the components.

Another embodiment of this invention contemplates a method wherein all of the components of an anti-friction bearing except the rolling elements or balls thereof are roughened and coated with a bonded lubricant. In other words, this method is identical with the preferred method of lubricating an anti-friction bearing with the exception that the balls are not included in the cleaning, surface-treating, coating, air drying and heating steps of the process. An anti-friction bearing lubricated in accordance with this embodiment of the invention would be substantially identical in structure to the anti-friction bearing shown in FIGS. 3 and 4.

Another embodiment of the present invention envisions the idea of lubricating an anti-friction bearing by surface-treating and coating with a bonded film lubricant only the cage means and the raceways in the inner and outer race means. In this embodiment of the invention, the unassembled inner and outer race means of the bearing are masked after being cleaned to cover all of the external surfaces thereof other than the raceways therein. After the masking step, the cage means and the raceways only are surface treated and coated with the lubricating composition. Aside from the masking step, this embodiment of the method is otherwise identical to the last embodiment and would result in the production of a lubricated bearing substantially identical in structure to the bearing shown in FIGS. 5 and 6.

Still another embodiment of the invention proposes a method of lubricating an anti-friction bearing wherein the raceways of the bearing are coated only and the cage means of the bearings is both surface treated and coated with the lubricating composition. After the coating of the raceways and cage means, the inner and outer race means and the cage means are air dried and then heated, following which all of the components of the bearing are re-assembled into an operative unit. An anti-friction bearing lubricated in accordance with this embodiment of the invention would be substantially identical in structure to the anti-friction bearing shown in FIGS. 7 and 8.

Although the present invention has been specifically shown and herein described in connection with a ball-type anti-friction bearing made of steel, it will readily be appreciated that the invention could be applied with equal facility to the lubrication of a roller-type anti-friction bearing or any other type made of iron, stainless steel or any other material suitable for use in the construction of anti-friction bearings.

Obviously many modifications and variations of the present invention are possible in the light of the above teachings. It is therefore to be understood that within the scope of the appended claims the invention may be practiced otherwise than as specifically described.

What is claimed is:

1. A self-contained lubricated anti-friction bearing having component parts comprising an inner race element having a raceway therein; an outer race element having a raceway therein; a plurality of rolling elements carried in said raceways and being movable relative thereto; cage elements associated with said rolling elements for separating said rolling elements, the improvement therewith having at least one of said elements roughened on the bearing surface thereof and completely enveloped by a bonded film lubricant having a predetermined thickness which is carried on the said roughened surface, said bonded film lubricant being comprised of a solid comminuted lubricant dispersed in a thermosetting resin and being substantially uniform in thickness.

2. An anti-friction bearing as claimed in claim 1 wherein said solid comminuted lubricant is comprised of a mixture of graphite and molybdenum disulphide.

3. An anti-friction bearing as claimed in claim 1 wherein solid comminuted lubricant is comprised of graphite.

4. An anti-friction bearing as claimed in claim 1 wherein said solid comminuted lubricant is comprised of molybdenum disulphide.

5. A self-contained lubricated anti-friction bearing comprising an inner race element having a raceway therein; an outer race element having a raceway therein; a plurality of rolling elements carried in said raceways and being movable relative thereto; cage elements associated with said rolling elements for separating said rolling elements, the improvement therewith having the said cage elements roughened on the bearing surface thereof and carrying a bonded film lubricant having a predetermined thickness thereon, said bonded film lubricant being comprised of a solid comminuted lubricant dispersed in a thermosetting resin and being substantially uniform in thickness, said bearing having a substantially uniform operating torque over the entire temperature operating range of said bonded film lubricant.

6. A self-contained lubricated anti-friction bearing having component parts comprising an inner race element having a raceway therein; an outer race element having a raceway therein; a plurality of rolling elements carried in said raceways and being movable relative thereto; cage elements associated with said rolling elements for separating said rolling elements, the improvement therewith having the surface of said raceways and the external surfaces of the said cage elements roughened and completely enveloped by a bonded film lubricant having a predetermined thickness thereon, said bonded film lubricant being comprised of a solid comminuted lubricant dispersed in a thermosetting resin and being substantially uniform in thickness, said bearing having a substantially uniform operating torque over the entire temperature operating range of said bonded film lubricant.

7. A self-contained lubricated anti-friction bearing having component parts comprising an inner race element having a raceway therein; an outer race element having a raceway therein; a plurality of rolling elements carried in said raceways and being movable relative thereto; cage elements associated with said rolling elements for separating said rolling elements, the improvement therewith having the surfaces of the said race elements and the external surfaces of the said cage elements roughened and completely enveloped by a bonded film lubricant having a predetermined thickness thereon, said bonded film lubricant being comprised of a solid comminuted lubricant dispersed in a thermosetting resin and being substantially uniform in thickness, said bearing having a substantially uniform operating torque over the entire temperature operating range of said bonded film lubricant.

8. A self-contained lubricated anti-friction bearing comprising an inner race element having a raceway therein and provided with roughened external surfaces thereon; an outer race element having a raceway therein and provided with roughened external surfaces thereon; a plurality of rolling elements having roughened external surfaces thereon carried in said raceways and being movable relative thereto; cage elements having roughened external surfaces thereon associated with said rolling elements and being operable to separate said rolling elements, the improvement therewith of a dry film lubricant of substantially uniform thickness and being bonded to said inner and outer race elements, said rolling elements and said cage elements, said bonded film lubricant being comprised of a solid comminuted lubricant dispersed in a thermosetting resin, said bearing having a substantially uniform operating torque over the entire temperature operating range of said bonded film lubricant.

References Cited in the file of this patent

UNITED STATES PATENTS

| | | |
|---|---|---|
| 2,078,456 | Pew | Apr. 27, 1937 |
| 2,219,054 | Palm | Oct. 22, 1940 |
| 2,697,645 | Mitchell | Dec. 21, 1954 |
| 2,754,168 | Atlee | July 10, 1956 |
| 2,901,380 | Crump | Aug. 25, 1959 |

FOREIGN PATENTS

| | | |
|---|---|---|
| 555,519 | Great Britain | Aug. 26, 1943 |